United States Patent [19]

Rispoli et al.

[11] Patent Number: 4,689,239

[45] Date of Patent: Aug. 25, 1987

[54] ASEPTICALLY PROCESSED, NATURAL, DAIRY-BASED SAUCES

[75] Inventors: Joseph M. Rispoli, Massapequa Park; Harold A. Sawyer, Peekskill; Robert T. Tewey, Wappeningers Falls, all of N.Y.; Clement R. Wyss, Hillsdale, N.J.; James E. Maly, Ridgefield, Conn.

[73] Assignee: General Foods Corporation, White Plains, N.Y.

[21] Appl. No.: 899,365

[22] Filed: Aug. 22, 1986

[51] Int. Cl.$^4$ .......................... A23L 1/39; A23L 1/187
[52] U.S. Cl. .................................... 426/578; 426/580; 426/589; 426/399; 426/613
[58] Field of Search ............... 426/578, 579, 399, 582, 426/586, 589, 613, 580

[56] References Cited

U.S. PATENT DOCUMENTS

| | | | |
|---|---|---|---|
| 3,970,767 | 7/1976 | Tessler et al. | 426/579 |
| 4,192,900 | 3/1980 | Cheng | 426/579 |
| 4,568,555 | 2/1986 | Spanier | 426/578 |
| 4,634,596 | 1/1987 | Eastman | 426/579 |

*Primary Examiner*—Jeanette Hunter
*Attorney, Agent, or Firm*—Thomas A. Marcoux; Thomas R. Savoie; Daniel J. Donovan

[57] ABSTRACT

A process for producing an aseptically-processed, natural, dairy-based sauce is disclosed. The process comprises blending a combination of whole milk or an equivalent amount of non-fat dry milk and water, heavy cream butter, corn starch, high amylose corn starch and flavors and particulates, heating the combination to a temperature of from 140° F. to 190° F. for from 10 minutes to 30 minutes, homogenizing, subjecting the homogenized blend to ultra-high temperature short time aseptic treatment, cooling and holding the final product for a period of time sufficient to increase the blend viscosity.

11 Claims, No Drawings

ASEPTICALLY PROCESSED, NATURAL, DAIRY-BASED SAUCES

TECHNICAL FIELD

The invention relates to a prepared dairy-based sauce specifically an aseptically processed dairy-based sauce which is all natural. The sauce is preferably refrigerated after production.

BACKGROUND ART

Consumers are increasing demanding convenience-type food products; products which take a minimum of preparation time but which are comparable to home made foods in terms of taste and quality. To this end, the prior art has attempted to produce high quality dairy-based and/or cheese-based sauces. In most, if not all cases, modified starches have been incorporated into these formulations to impart to the food product a desired thick viscosity especially in those instances where the products are retorted or aseptically processed.

U.S. Pat. No. 3,970,767 issued to Tessler et. al. teaches modified starch blends suitable for use in retorted food products. These starch products are employed as thickeners for piefillings, sauces, soups, baby foods, etc. The starches develop significant viscosity after retort cooking temperatures (240°–300°F.).

U.S. Pat. No. 4,192,900 issued to Cheng teaches an improved retorted or aseptically packaged, tapioca-style pudding containing at least one starch in a milk-based pudding formula. The pudding is processed by an ultra-high temperature, short time method in which the pudding ingredients are combined into a slurry which is preheated to a slurry temperature of from 140° to 150° after which the slurry is placed into a cooker until where its temperature is raised rapidly to 285° to 305°F. for only 8 to 12 seconds, cooled and then aseptically packaged.

U.S. Pat. No. 4,568,555 issued to Spanier teaches a shelf stable cheese sauce having good mouthfeel and superior tolerance to heat. The sauce has incorporated therein from about 4 to about 7 weight percent of at least one starch, preferably a corn starch or mixture of corn starches.

While consumers are interested in convenience-type foods they are also increasingly conscious of food additives and ingredients which are chemically-modified; i.e. non-natural.

While the art has produced aspetically-processed, high viscosity dairy based sauces, it would be desirable to produce an aseptically-processed dairy-based sauce which is all natural containing a natural starch mixture which can impart to the sauce product a desirable texture and mouthfeel.

DISCLOSURE OF THE INVENTION

The present invention relates to a process for producing an aseptically-processed, all natural, dairy-based sauce. The process comprises intimately blending a combination of ingredients made up of whole milk from 40 to 80% by weight of the sauce or an equivalent amount of non-fat dry milk and water, heavy cream from 0 to 25% by weight, butter from 1 to 15% by weight, corn starch from 2 to 10% by weight, high amylose corn starch from 1 to 8% by weight and lastly flavors and particulates from 0 to 40% by weight. The blended combination is heated to a temperature of from 140°F. to 190°F. for from about 10 minutes to 30 minutes and then homogenized. Thereafter the homogenized blend is heated to a temperature exceeding 250°F. for from about 10 seconds to about 120 seconds. The heated, homogenized blend is then cooled and held for a period of time sufficient to increase the viscosity of the blend until it has developed a spoonable consistency. The sauce is produced from all natural ingredients and yet the sauce possesses a desirable texture and mouthfeel.

BEST MODE FOR CARRYING OUT THE INVENTION

The present invention relates to a process for producing an aseptically processed, all-natural dairy-based sauce. Preferably the combination of ingredients which make up the sauce comprise whole milk from 50 to 70% by weight or the equivalent amount of non-fat dry milk and water, heavy cream from 8 to 16%, butter from 3 to 10%, corn starch from 3 to 6%, high amylose corn starch from 1 to 3% and flavors and particulates from 1 to 20%.

The amount of non-fat dry milk and water which would be necessary to replace the whole milk present in the ingredient formula can be calculated by determining the amount of solids and water in the whole milk and replacing them with non-fat dry milk and water respectively. The fat contained within the whole milk may be replaced with butter.

The natural corn starch which is incorporated into the dairy-sauce product of this invention should consist of a majority of amylopectin, preferably it should consist essentially only of amylopectin. An example of such a corn starch is Amioca, produced by National Starch and Chemical Corporation which starch consists entirely of amylopectin. The natural high amylose corn starch should contain greater than 50% amylose. An example of such a commercially available high amylose corn starch is Hylon TM produced by National Starch and Chemical Corporation. Each of these starches contributes to the production of the final product viscosity. The corn starch aids in the blending of ingredients because it thickens during the mixing operation. The corn starch also controls the gelatin resulting in a smooth viscous product. However, the corn starch loses most of its viscosity during homogenization and the ultra-high temperature, short time aseptic processing where the temperature will exceed 250°F. The high amylose corn starch gives the product its final viscosity by "cooking out" at these high temperatures. The final product viscosity, measured by a Brookfield Viscometer at 3,000 to 30,000 centipoise, does not occur until two to three days after cooling and packaging, due to the slow development of the high amylose corn starch. The smooth, creamy, spoonable texture of the final product cannot be obtained by the use of either of the starches above; the combination within the aforementioned ranges is essential.

The term flavors and particulates which comprise from 0 to 40% by weight of the sauce, preferably from 1 to 20% by weight of the sauce refers to such ingredients as salt, pepper, nutmeg, annatto, cheeses, mushrooms, peppers and the like.

After the ingredients have been blended the blend is heated to a temperature of from 140°F. to 190°F., for from about 10 minutes to 30 minutes.

Preferably the blend is heated to a temperature of from 175°F. to 180°F. for from about 20 minutes to about 25 minutes. Thereafter the heated blend is homogenized. Suitable homogenization conditions to produce a stable emulsion and a smooth, consistant product are practiced in a two stage process at pressures of from 1000 to 3000 psi in the first stage and from 0 to 1000 psi in the second stage. Preferably, the homogenization conditions are approximately 2500 psi first stage and 500 psi in the second stage.

The homogenized blend is then aseptically processed by any suitable ultra-high temperature, short-time method. The blend is heated to a temperature exceeding 250°F. and held at that temperature for from about 10 seconds to 120 seconds. Preferably the blend is heated to a temperature of from 270°F. to 280°F. for from about 30 seconds to about 60 seconds.

Thereafter, the sauce is cooled preferably to a temperature within the range of from about 75°F. to about 105°F. and is packaged. The product is preferably refrigerated but it must be held prior to use or sale because the final product viscosity does not develop immediately. The sauce product must be held for a period of time sufficient to increase the blend viscosity. This period of time will range from about 3 to 10 days, preferably from about 3 to 5 days. The viscosity of the final product will range from 3,000 to 30,000 centipoise. Texturally the product will have a thick, creamy consistency which is spoonable out of a packaged container. The product exhibits refrigeration stability of at least 120 days and has a 70°F. shelf-life of up to 50 days. The product is smooth organoleptically and it will not break down. The pH of the sauce will range from 5.1 to 6.6. The sauce may be flavored to produce a wide range of dairy-based products such as nacho cheese, cheddar cheese, creamy mushroom, alfredo and the like.

Where desirable, the sauce may additionally contain a buffer which is selected from the group consisting of sodium citrate and potassium citrate. Optionally, combinations of these buffers may be utilized. The buffer may be incorporated into the dairy-based sauce at a level of from about 0.1% to about 3.0%.

The invention is further described but not limited to the Examples set forth below.

EXAMPLE 1

An all natural, aseptically-processed cheddar cheese sauce having the following formula was prepared.

| Ingredient | Percentage (by weight) |
| --- | --- |
| Whole Milk | 46.1 |
| Heavy Cream | 9.0 |
| Butter | 3.2 |
| Corn Starch (Amioca-National Starch and Chemical Corporation) | 4.0 |
| High Amylose Corn Starch (Hylon V TM National Starch and Chemical Corporation) | 1.5 |
| Trisodium Citrate | 0.2 |
| Salt and Cheddar Cheese | 36.0 |
|  | 100.0 |

The starches and milk were mixed in a high speed blender and transferred to a batch tank. The remainder of the ingredients were added and mixed thoroughly. The blend was heated to 180°F. and was held at that temperature for 20 minutes. The heated blend was then subjected to a two stage homogenization at pressures of 2500/500 psi. The homogenized blend was placed in a holding tank and then underwent ultra-high temperature short time aseptic treatment by being pumped through a scrape-surface heat exchanger. The product was brought up to a temperature of 275°F. ±5°F. and held at that temperature for approximately 32 seconds. Thereafter the product was cooled down to 100°F. and packaged. After 4 days the product was analyzed and it was determined that it had a creamy, smooth, spoonable texture. The viscosity of the final product was 30,000 centipoise.

EXAMPLE 2

An all natural, aseptically-processed cheddar cheese sauce which was similar to Example 1 was produced with the exception that non-fat dry milk and water were substituted for the whole milk. The specific formula is set forth below:

| Ingredient | Percentage (by weight) |
| --- | --- |
| Water | 47.5 |
| Heavy Cream | 8.1 |
| Non-Fat Dry Milk | 3.8 |
| Corn Starch (Amioca-National Starch and Chemical Corporation | 3.6 |
| Butter | 2.8 |
| High Amylose Corn Starch (Hylon V TM National Starch and Chemical Corporation) | 1.4 |
| Trisodium Citrate | 0.2 |
| Salt and Chedder Cheese | 32.5 |
|  | 100.0 |

The process for preparing this sauce differed slightly from the process set forth in Example 1 in that the ingredients were separately mixed in three differed fractions prior to being combined in the batch tank. The three different fractions were a combination of water, cheese and sodium citrate; water, cream non-fat dry milk, butter, salt and annatto; and water and starch. However after the three fractions are combined and admixed in the batch tank the remainder of the process is identical to that set forth in Example 1.

EXAMPLE 3

An all-natural classic white sauce was prepared utilizing the following formula.

| Ingredient | Percentage (by weight) |
| --- | --- |
| Whole Milk | 67.1 |
| Heavy Cream | 15.2 |
| Butter | 10.0 |
| Corn Starch (Amioca-National Starch and Chemical Corporation) | 4.0 |
| High Amylose Corn Starch (Hylon V ™ National Starch and Chemical Corporation) | 3.0 |
| Salt, White Pepper and Nutmeg | 0.7 |
| | 100.0 |

The ingredients listed above were processed in the same manner as disclosed in Example 1. The product was smooth and creamy with a spoonable texture. The viscosity was measured at 5,000 centipoise.

I claim:

1. A process for producing an aseptically-processed, natural, dairy based sauce which comprises:
   (a) intimately blending a combination of ingredients comprising whole milk from 40 to 80% by weight of the sauce or an equivalent amount of non-fat dry milk and water, heavy cream from 0 to 25% by weight, butter from 1 to 15% by weight, corn starch from 2 to 20% by weight, said corn starch comprising a majority of amylopectin, high amylose corn starch from 1 to 8% by weight, said high amylose corn starch comprising greater than 50% amylose, and flavors and particulates from 0 to 40% by weight;
   (b) heating the blended combination to a temperature of from 140°F. to 190°F. for from about 10 minutes to 30 minutes;
   (c) homogenizing the heated blend of step (b);
   (d) heating the homogenized blend of step (c) to a temperature exceeding 250°F. for from about 10 seconds to about 120 seconds;
   (e) cooling the blend of step (d); and
   (f) holding the blend of step (e) for a period of time sufficient to increase the blend viscosity to 3,000 to 30,000 centipoise.

2. The process of claim 1 wherein the combination of ingredients of step (a) comprises whole milk from 50 to 70% by weight or the equivalent amount of non-fat dry milk and water, heavy cream from 8 to 16% by weight, butter from 3 to 10%, corn starch from 3 to 6%, high amylose corn starch from 1 to 3% and flavor and particulates from 1 to 20%.

3. The process of claim 1 wherein the heating of step (b) is at a temperature of from 175°F. to 180°F. for from about 20 minutes to about 25 minutes.

4. The process of claim 1 wherein the heating of the homongenized blend in step (d) is at a temperature of from 270°F. to 280°F. for from about 30 seconds to about 60 seconds.

5. The process of claim 1 wherein the period of time sufficient to increase the blend viscosity in step (e) varies from about 3 days to 10 days.

6. The process of claim 5 wherein the period of time varies from about 3 days to 5 days.

7. The process of claim 1 wherein the dairy based sauce is refrigerated.

8. The process of claim 1 wherein the dairy based sauce additionally comprises a buffer selected from the group consisting of sodium citrate, potassium citrate and combinations thereof, at a level of from about 0.1% to about 3.0%.

9. The process of claim 1 wherein the dairy based sauce has a pH ranging from 5.1 to 6.6.

10. The process of claim 1 wherein the corn starch consists essentially of amylopectin.

11. The product produced by the process of claim 1.

* * * * *